US006527178B1

(12) United States Patent
Gordon et al.

(10) Patent No.: US 6,527,178 B1
(45) Date of Patent: Mar. 4, 2003

(54) METHOD FOR AUTHENTICATING MAILPIECES

(75) Inventors: Roy A. Gordon, Gaithersburg, MD (US); Wayne A. Wilkerson, Manassas, VA (US); Dan J. Lord, Upper Marlboro, MD (US)

(73) Assignee: United States Postal Service, Washington, DC (US)

( * ) Notice: Subject to any disclaimer, the term of this patent is extended or adjusted under 35 U.S.C. 154(b) by 70 days.

(21) Appl. No.: 09/714,846

(22) Filed: Nov. 16, 2000

Related U.S. Application Data

(60) Provisional application No. 60/165,810, filed on Nov. 16, 1999.

(51) Int. Cl.[7] .......... G06K 7/10; G06F 17/60

(52) U.S. Cl. .......... 235/385; 235/375; 235/462.01

(58) Field of Search .......... 235/360, 379, 235/375, 381, 383, 492, 493, 462.01, 472.01, 60, 61; 705/401, 410, 405, 408, 402, 403; 380/25, 49, 50, 55

(56) References Cited

U.S. PATENT DOCUMENTS 4,376,299 A 3/1983 Rivest .......... 364/900
4,420,819 A 12/1983 Price et al. .......... 364/900

(List continued on next page.)

FOREIGN PATENT DOCUMENTS

WO WO98/14907 * 4/1998

OTHER PUBLICATIONS

The United States Postal Service (USPS), *Information–Based Indicia Program (IBIP), Performance Criteria for Information–Based Indicia and Security Architecture for Closed IBI Postage Metering Systems (PCIBI–C)*, Jan. 12, 1999.

The United States Postal Service (USPS), *Information–Based Indicia Program (IBIP), Performance Criteria for Information–Based Indicia and Security Architecture for Open IBI Postage Evidencing Systems (PCIBI–O)*, Feb. 23, 2000.

*Primary Examiner*—Thien M. Le
(74) *Attorney, Agent, or Firm*—Leydig, Voit & Mayer, Ltd.

(57) ABSTRACT

Presented is a method for authenticating mailpieces utilizing cryptographically secured or plain text indicia printed on the mailpiece as evidence of postage payment without the necessity of including recipient address information in the indicia. This reduces the physical size of the required indicia, allowing additional real estate on the face of a mailpiece to be utilized for advertising verbiage, graphics, personal messages, illustrations, etc. Counterfeiting of the indicia is deterred by maintaining a master log database of the printed indicia. The information stored in the master log database preferably associates a transaction or serial number of the printed indicia with recipient address information. Counterfeit indicia are identified through a comparison of the stored information in the master log database with information scanned from the mailpiece itself Counterfeits may also be detected by recognizing the multiple occurrences of identical indicia.

20 Claims, 5 Drawing Sheets

U.S. PATENT DOCUMENTS

| | | | | | |
|---|---|---|---|---|---|
| 4,630,201 | A | | 12/1986 | White | 364/408 |
| 4,649,266 | A | | 3/1987 | Eckert | 235/432 |
| 4,723,284 | A | | 2/1988 | Munck et al. | 380/25 |
| 4,775,246 | A | | 10/1988 | Edelmann et al. | 380/23 |
| 4,780,828 | A | | 10/1988 | Whisker | 364/464.02 |
| 4,807,287 | A | | 2/1989 | Tucker et al. | 380/23 |
| 4,893,338 | A | | 1/1990 | Pastor | 380/25 |
| 4,962,454 | A | | 10/1990 | Sansone et al. | 364/464.02 |
| 4,999,481 | A | | 3/1991 | Baer et al. | 235/375 |
| 5,008,827 | A | | 4/1991 | Sansone et al. | 364/464.02 |
| 5,050,078 | A | | 9/1991 | Sansone | 364/406 |
| 5,060,165 | A | | 10/1991 | Schumacher et al. | 364/478 |
| 5,077,694 | A | | 12/1991 | Sansone et al. | 395/600 |
| 5,292,030 | A | | 3/1994 | Kateman et al. | 222/1 |
| 5,390,251 | A | | 2/1995 | Pastor et al. | 380/21 |
| 5,454,038 | A | | 9/1995 | Cordery et al. | 380/23 |
| 5,457,642 | A | | 10/1995 | Brookner | 364/569 |
| 5,535,279 | A | | 7/1996 | Seestrom | 380/55 |
| 5,825,893 | A | * | 10/1998 | Kara | 380/51 |
| 5,917,925 | A | | 6/1999 | Moore | 382/101 |
| 6,227,445 | B1 | * | 5/2001 | Brookner | 235/375 |
| 6,240,403 | B1 | * | 5/2001 | Shah et al. | 705/40 |
| 2002/0078663 | A1 | * | 6/2002 | Kramer et al. | 53/411 |

* cited by examiner 40 42 44

| Indicia serial or traction # | Recipient address information | Occurrence Flag | . . . |
| --- | --- | --- | --- |
| ⋮ | | | . . . |

METHOD FOR AUTHENTICATING MAILPIECES

RELATED APPLICATIONS

This application claims the benefit of U.S. Provisional Application No. 60/165,810, filed Nov. 16, 1999.

FIELD OF THE INVENTION

This invention relates generally to postage for mailpieces, and more particularly to systems and methods for authenticating the payment of postage for mailpieces.

BACKGROUND OF THE INVENTION

Postal authorities typically require an amount of postage be paid for the processing of each mailpiece. Typically, and most often for individual personal use, the indication to the postal authority that the proper amount of postage has been paid is evidenced by the placement of a postage stamp on the actual mailpiece sent through the postal system. These postage stamps are sold in various denominations, and are typically applied to the mailpiece through an adhesive backing on the postage stamp. In this form, the postal authority requires a minimum amount of postage for a first class letter up to a certain weight, letters above which must include additional postage for proper processing.

To overcome these problems existing with the usage of conventional postage stamps, the usage of postage meters has been authorized by the postal authorities. While not in widespread usage among individual consumers, many businesses have acquired such postage meters to apply postage to the mailpieces sent therefrom. These postage meters print a postage indicia on the mailpieces themselves, or on adhesive labels which may be applied to the mailpieces to indicate to the postal authority that the proper amount of postage is affixed thereto. A benefit of the postage meters is that an exact amount of postage due for the processing of individual mailpieces of a particular weight may be dispensed by the postage meter, thus reducing the inclusion of excess postage on the individual mailpieces. This may result in a cost savings to mailers over the usage of traditional postage stamps.

One problem with the usage of existing postage meters concerns the ability to counterfeit the postage impression. While certain information is contained in the postage indicia printed by the postage meter, such information can not necessarily ensure that counterfeiting of these indicia is not taking place. In an effort to curtail such counterfeiting, some postage meters utilize specially formulated inks when printing the indicia to inhibit the ability of postage counterfeiters from merely copying the printed indicia.

In an attempt to reduce such electronic counterfeiting, various systems have been proposed. One such system is described in U.S. Pat. No. 4,725,718, by Sansone, et al. for a Postage And Mailing Information Applying System. The system described by this patent generates and applies postage information on an envelope or mailing label in the form of a postage indicia. This postage indicia includes a unique encrypted line relating the recipient's address and the postage information. This patent describes that including such encrypted recipient address information in the postage indicia, the indicia becomes unique for that particular mailpiece based upon the specific relationship between the encrypted message and the human readable recipient address on the mailpiece itself. In this way, the patent describes that the printed indicia containing this encrypted recipient address information may not be counterfeited and used for mailpieces to be delivered to any other address than that for which it was originally generated. A drawback to this approach is that recipient address information must be included in the postage indicia, thus making indicia larger than it might otherwise be. Smaller indicia are seen as superior in that they require less ink to print and occupy less space on the front of the envelope.

Therefore, there exists a need for a system that effectively prohibits counterfeiting while providing a smaller indicia on the mailpiece. Such a system is presented by the instant invention.

SUMMARY OF THE INVENTION

It is therefore an object of the instant invention to provide a new and improved system and method for authenticating mailpieces. More particularly, it is an object of the instant invention to provide a new and improved method and system for authenticating mailpieces whereby the postal indicia size is reduced from that of prior methods to allow increased availability of the envelope for other purposes on the mailpiece. Further, it is an object of the instant invention to allow consumers to obtain the postal indicia with a minimum of difficulty taking advantage of modern computer technology. It is a further object of the instant invention to allow the utilization of the system and method of the instant invention without the necessity of dedicated hardware which must be obtained by a consumer. However, it is also an object of the instant invention to allow utilization of the system and method of the instant invention on dedicated hardware specifically manufactured for this purpose, should such be desired. It is an additional object of the instant invention to reduce the cost to the consumer of utilizing the method and system of the instant invention. Additionally, it is an object of the instant invention to maintain or improve the level of assurance that the postal indicia has not been counterfeited.

In view of these objects, it is a feature of the instant invention to provide a postage indicia which is small in size, reducing the required amount of real estate on the mailpiece for its placement, thereby allowing additional real estate for advertising verbiage and graphics, as well as personal messages, graphics, etc. In view of these objects and features, it is an aspect of the instant invention that a log of all indicia created by a user be created. This log is then transmitted to the postal authority either on a daily basis or in real time. It is a further aspect of the instant invention that the postal authority maintains a database of all postage indicia logs which it utilizes to verify proper postage indicia and to identify counterfeit indicia. It is a further aspect of the instant invention that the postage indicia printed by a user contain a serial or transaction number. It is an additional aspect of the instant invention that the log generated from the postage indicia contain both the serial or transaction number of the postage indicia as well as the recipient address information of the mailpiece onto which that postage indicia is affixed. In an alternate aspect of the instant invention, the postage indicia included on the mailpiece is printed in plain text, and the log information is digitally signed prior to transmission to the postal authority. The plain text may be encoded in machine readable form.

A further aspect of the instant invention is that the postal authority index the master database created from the log entries from all of the postage consumers by serial or transaction number of the postage indicia. Further, it is an aspect of the instant invention that as mailpieces are sorted through the postage system, the postage indicia is scanned to identify proper postage and the serial or transaction number. This information is then used to identify the database entry for that postage indicia so that the expected recipient address information may be extracted from the master database. Once this expected recipient address information has been extracted from the database based upon the indicia serial or transaction number, it is compared to the actual recipient address information contained on the mailpiece. If there is a discrepancy between the expected and the actual recipient address information, the mailpiece will be identified as containing counterfeit indicia.

Alternatively, it is an aspect of the instant invention that a log not be maintained by the postal consumers. Instead, the postal authority will scan each mailpiece as it is processed through the postal system to identify the indicia transaction or serial number. This information will be stored in a master database where it will be utilized by the postal authority to identify counterfeit postage indicia. As with the prior embodiment, the master database will be indexed by transaction or serial number. As each subsequent mailpiece is processed by the postal authority, its indicia serial or transaction number will be compared to the master database to determine if an identical serial or transaction number already exists therein. If a match is found in the master database, the mailpiece will be identified as containing counterfeit indicia.

Other objects and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Before turning to a specific discussion of the instant invention as described in relation to the following exemplary embodiments, and while such will be understood by one skilled in the art, it should be stated that the following description is presented to aid in the understanding of the instant invention. As such, the exemplary embodiments described hereinbelow are presented by way of example and not by way of limitation. Embodiments of the instant invention other than those described below exist, however an exhaustive discussion of every embodiment of the instant invention within the scope of the appended claims is neither possible nor required in this patent document. Therefore, the applicant respectfully reserves the right to any such embodiment within the scope of the appended claims.

As will be understood by one skilled in the art in view of the foregoing discussion of the Background and Summary of the Invention, the instant invention is directed to a system and method for authenticating mailpieces which utilizes a cryptographically secured indicia printed on a mailpiece as evidence of the postage payment. Alternatively, the indicia may be printed in plain text on the mailpiece, so long as the log information from the mailer (described more fully below) is digitally signed or otherwise cryptographically secured. In either embodiment, the indicia of the instant invention occupies a significantly reduced area of the mailpiece real estate allowing additional real estate to be made available for advertising verbiage and graphics, as well as personal messages and images. This greatly reduced postage indicia is achieved by removing the mailpiece's recipient address information from the indicia.

Figure 1:
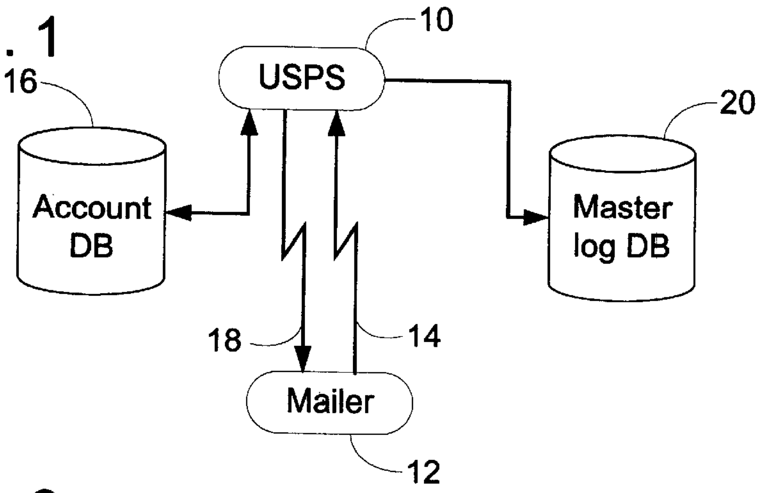
FIG. 1 is a simplified architectural block diagram of an exemplary embodiment of a system of the instant invention.

To allow the utilization of the system and method of the instant invention while still ensuring that counterfeit indicia may be detected, an architecture such as illustrated in FIG. 1 may be utilized. Specifically, the simplified exemplary architecture of FIG. 1 includes a mail processing organization such as, for example, the postal authority 10 which communicates with a postal consumer or mailer 12 who wishes to place a mailpiece in the postal system. In this exemplary architecture, the mailer's computer 12 transmits a request for postage 14 to the postal authority 10. This request may be transmitted by any conventional means including electronically via the Internet or a computer modem, or by voice communication over the telephone, or even through a request mailed through the postal system. Cryptographic techniques and security protocol such as SSL may be used to secure communications between mailers 12 and the postal authority 10.

Once this request has been received by the postal authority 10 it is processed therein. Part of the processing of this request ensures that proper payment for the postage has been received. Such payment may be made as part of the request itself via a credit card, electronic cash, or the authorization to debit an account which may be maintained by the postal authority through an account database 16. Other methods of payment may be appropriate, such as maintaining a line of credit with the postal authority, and are included within the scope of the instant invention.

Once the request for postage has been fully processed within the postal authority 10, the cryptographically secured or plain text postage indicia is transmitted 16 to the mailer 12. As with the request 14, the transmission of the postage indicia 16 may be in any conventional means including electronic transmission via the Internet, modem, etc. The mailer 12 then places the postage indicia on the mailpiece and deposits the mailpiece in the postal system for delivery by the postal authority 10 to the desired recipient.

In a preferred embodiment, the indicia is a data file or structure having a plurality of data fields, including a serial number field, a data field and a postage amount field. The indicia also includes a digital signature created using an asymmetric private key held by the postal authority. The digital signature authenticates the information contained in the indicia as having originated with the postal authority. An example of a cryptographically-secured indicia is provided in the Information-Based Indicia Program Performance Criteria For Information-Based Indicia And Security Architecture For Open IBI Postage Metering Systems, published Mar. 11, 1999 by the United States Postal Service and available via the Internet at URL http://www.usps.gov/ibip/documents/specs/pcibi-625.pdf (the contents of which are hereby incorporated by reference in their entirety). The indicia used in the present invention need not include any recipient address information. Alternatively, the indicia itself may forgo the digital signature since the postal authority checks for duplication of the indicia as will be explained below. Explanation as to how this information may be used in accordance with the invention to verify indicia is provided below.

To prevent and deter attempts at counterfeiting the postage indicia, the system of the instant invention requires that, as part of the request 14, the mailer 12 transmit recipient address information to the postal authority 10. The postal authority 10 then associates the recipient address information with the indicia created therein and stores this information in a master log database 20, the structure of which will be discussed more fully hereinbelow. At this point, the master log database stores the associated indicia and recipient address information in an indexed fashion within the database 20. Preferably, the postage indicia contains a serial or transaction number which may be utilized to index the master log database 20.

The recipient address information associated with the indicia may contain the entire recipient address transmitted to the postal authority as part of the request 14, or may be any subset of this recipient address information as desired. The only requirement is that this subset of information should be adequate to identify the recipient. As an example, the recipient's zip code may provide an adequate level of identification of the recipient in one system, whereas additional information may be required to properly identify a recipient in another system.

Figure 2:
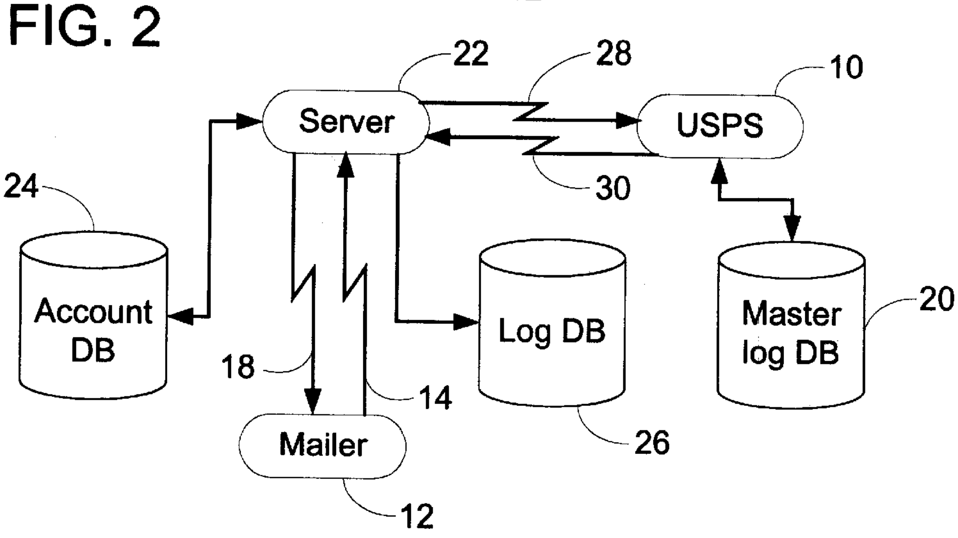
FIG. 2 is a simplified architectural block diagram of an alternate embodiment of a system incorporating the system and method of the instant invention.

An alternate architecture implementing the system and method of the instant invention is illustrated in FIG. 2, which includes similar numbering for similar elements as that illustrated in FIG. 1 to aid in the understanding of the invention. Specifically, FIG. 2 illustrates an architecture which utilizes a third-party server 22 which operates as a distribution entity for the postage indicia. This third-party server 22 interfaces with the mailer 12 in much the same way as the mailer 12 interfaces with the postal authority 10 in FIG. 1. Specifically, the mailer 12 transmits a request 14 to the third-party server 22 to request postage indicia. This request also contains the recipient address information required, and may be transmitted via any of the mechanisms discussed above, including the Internet, modem, voice, etc.

The server 22 may include an account database 24 wherein the various mailers 12 may maintain an account. In such an event, the mailer 12 would transmit as part of its request 14 the authorization information necessary to allow the server 22 to debit the mailer's account stored in the account database 24. Alternatively, as with the system described with regard to FIG. 1, the mailer may also transmit appropriate credit card information or pay for the required postage via electronic cash, or other means. Further, the mailer 12 may maintain a line of credit with the server 22. The server generates the postage indicia and associates with it the recipient address information received as part of the request 14. Once this indicia has been transmitted to the mailer 12, this associated indicia/recipient address information is stored by the server 22 in its own internal log database 26.

The information from this internal log database 26 is then periodically transmitted 28 to the postal authority 10 for ultimate incorporation into the master log database 20. This transmission may occur on periodic intervals, and would be, at a minimum, on a daily basis. Alternatively, the third-party server 22 may transmit the associated postage indicia and recipient address information to the postal authority 10 in a real or pseudo-real time manner, thus dispensing with a formalized separate log database 26. However, recognizing that some transient storage of this associated information may be necessary to facilitate proper transmission to the postal authority 10, illustrating a memory type structure 26 should not confuse one skilled in the art. This information is preferably cryptographically secured utilizing techniques as described above.

This transmission 28 is preferably accomplished electronically via any known means, including the Internet, modem, facsimile transmission, etc. Alternatively, this information could be provided via electronic storage media such as a diskette, CD, etc. or via a batch printout preferably in computer readable form. Further, the postal authority 10 could selectively audit the mail stream by capturing images of randomly-selected mailpieces, periodically comparing the recipient's address information on the face of the mailpiece with the information contained in the log database 26.

Figure 3:
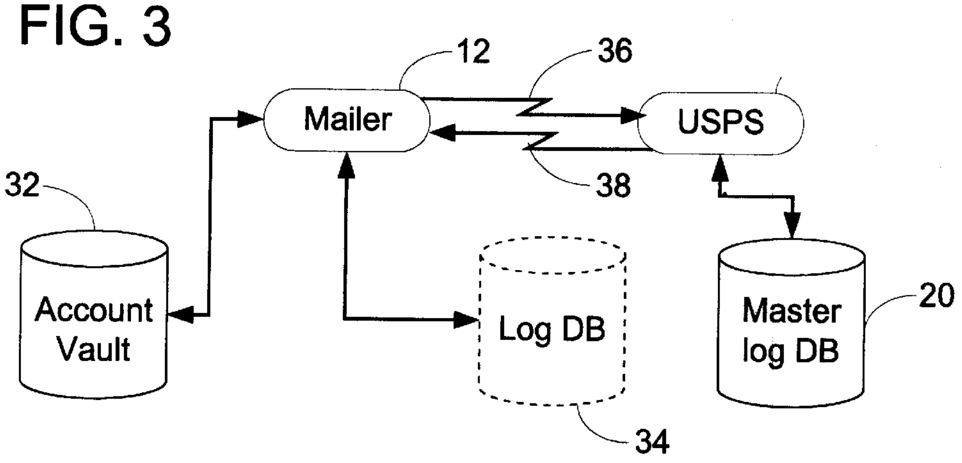
FIG. 3 is a simplified architectural block diagram of a further alternate embodiment of a system incorporating the system and method of the instant invention.

An alternate architecture incorporating the system and method of the instant invention as illustrated in FIG. 3. In this architecture, the mailer 12 possesses an account vault 32 from which it may draw postage from for usage on individual mailpieces. This account vault 32 may be part of a designated postage meter capable of producing the cryptographically secured or plain text indicia, or may be a secured piece of hardware which may be attached to or integrated with the mailer's computer system. Such allows the mailer 12 to utilize its standard computing equipment and printers to apply the postage indicia to mailpieces. In this architecture, the mailer 12 draws out a portion of the postage contained in the account vault 32, generates the postage indicia, and prints this indicia on the mailpiece.

The mailer 12 also internally associates the indicia generated with the recipient address information required by the system. This associated information is either stored in the account vault 32, or in an internally maintained log database 34. This log database 34 may be a formalized object, or may simply be an allocated area of memory within the computer system. This memory may or may not be maintained once the information contained therein is transmitted 36 to the postal authority 10 for ultimate inclusion in the master log database 20. Preferably, this information is cryptographically secured, especially in the instance when the indicia is printed in plain text. In the instance that the indicia is cryptographically secured, this information need not be cryptographically secured, although such techniques allows authentication of this information. As with the prior architecture, the transmission 36 of this associated information may be accomplished periodically, or in real or pseudo-real time. Also, as with the previous architecture, the postal authority 10 may obtain this associated information via an audit 38 of the mailer 12.

However, in both this architecture and the architecture described in FIG. 2, the transmission or auditing of this associated information should take place in a manner which allows this information to be available to the postal authority 10 at some point during which the mailpiece containing the indicia and recipient address information is in the postal system, preferably prior to delivery thereof. This is particularly important when the indicia is printed on the mailpiece is in plain text. While it is possible to perform post delivery audit by first obtaining the information from the individual mailpieces in the postal system and then cross checking this information with the information received from the third-party server 22 or the mailer 12, it is preferred that the counterfeit indicia be detected prior to delivery. However, either system is within the scope of the instant invention.

Further, the system and method of the instant invention also contemplates a hybrid system wherein some associated information will be received from the mailers 12 and third-party servers 22 for storage in the master log database 20, and some information will first be received by the postal authority 10 by scanning the individual mailpieces within the postal system. In such a system, counterfeit indicia will be both detected during mailpiece processing prior to delivery, and some counterfeit indicia will be detected in a post delivery situation. It is believed that the knowledge of the recipient may provide an adequate safeguard against the usage of counterfeit indicia since this recipient may be held accountable, or may be requested to turn over the identity of the individual or company which sent the mailpiece to the recipient.

Figures 4, 5:
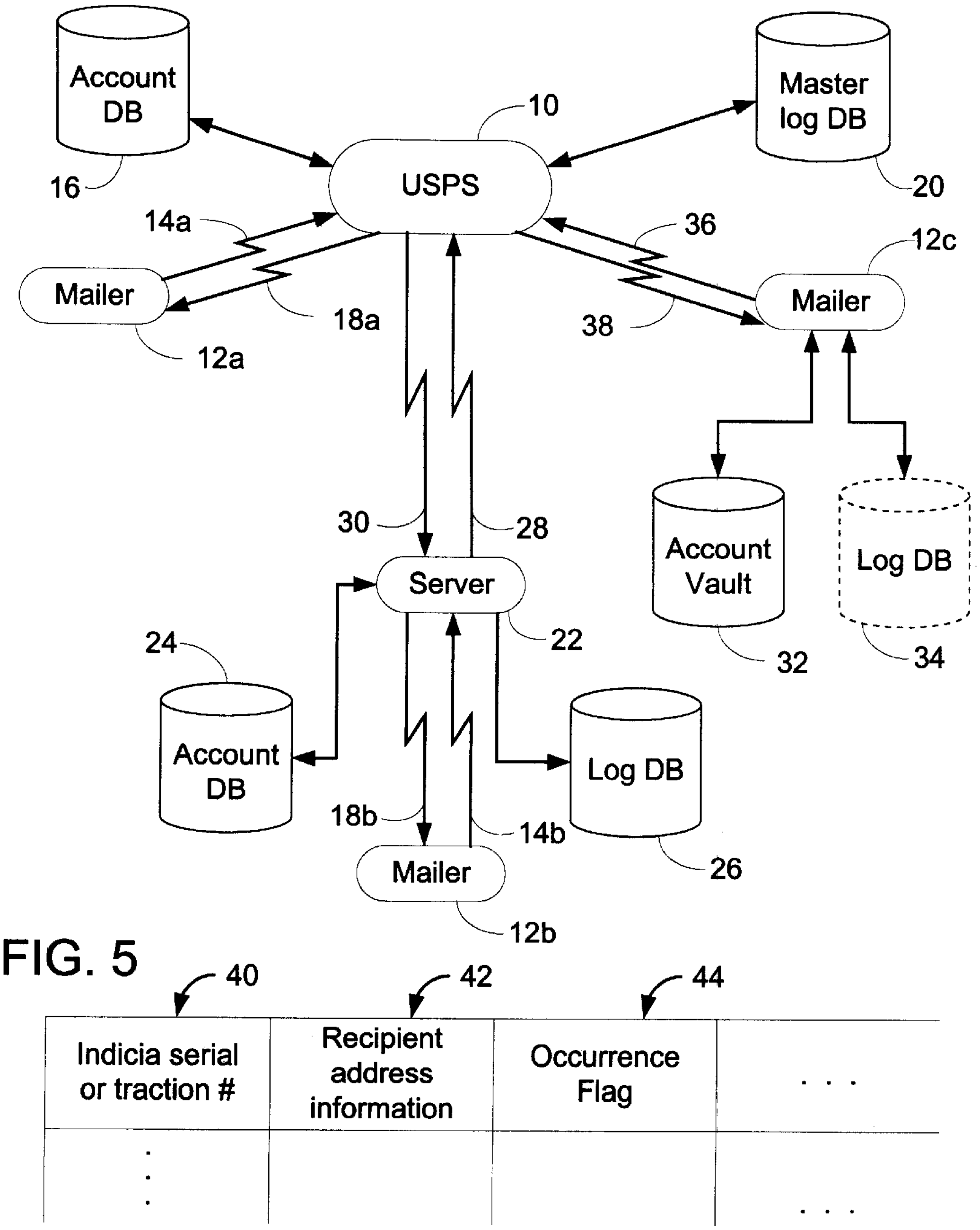
FIG. 4 is a simplified architectural block diagram of a further alternate embodiment of a system incorporating the system and method of the instant invention.
FIG. 5 is a simplified data structure diagram illustrating an aspect of the instant invention.

A preferred embodiment of a system architecture which incorporates the system and method of the instant invention is illustrated in FIG. 4. As may be seen from this FIG. 4, preferably the postal authority 10 incorporates the architectures described above with regard to FIGS. 1, 2, and 3 in a working architecture which provides maximum flexibility. As will be recognized by one skilled in the art, only one instance of each type of interface is provided in this FIG. 4, recognizing that multiple independent mailers 12*a* may contact the postal authority 10 at one time, and that multiple third-party servers 22 may also be in existence in various parts of the country. It is also recognized that there may be multiple mailers 12c which possess accounting vault hardware 32 as well. FIG. 4 also illustrates that the information collected from each of these various sources is processed into a master log database 20 which is used for counterfeit indicia identification.

While the exact structure of the master log database 20 maintained by the postal authority 10 may contain information necessary but unrelated to the instant invention, FIG. 5 illustrates an exemplary data structure containing minimal elements for supporting the system of the instant invention. Specifically, FIG. 5 illustrates a master log database structure which includes a field 40 for the indicia serial or transaction number, which preferably is used to index the entries within the master log database 20. Additionally, the system of the instant invention requires that a field 42 be included for the recipient address information. While these two associated data fields 40, 42 provide the minimum amount of information necessary for proper operation of the system and method of the instant invention, an additional data field 44 may be included to track the number of occurrences of a particular indicia serial or transaction number. The operation of the system and method of the instant invention which utilizes these data fields will be described in greater detail hereinbelow.

Figure 6:
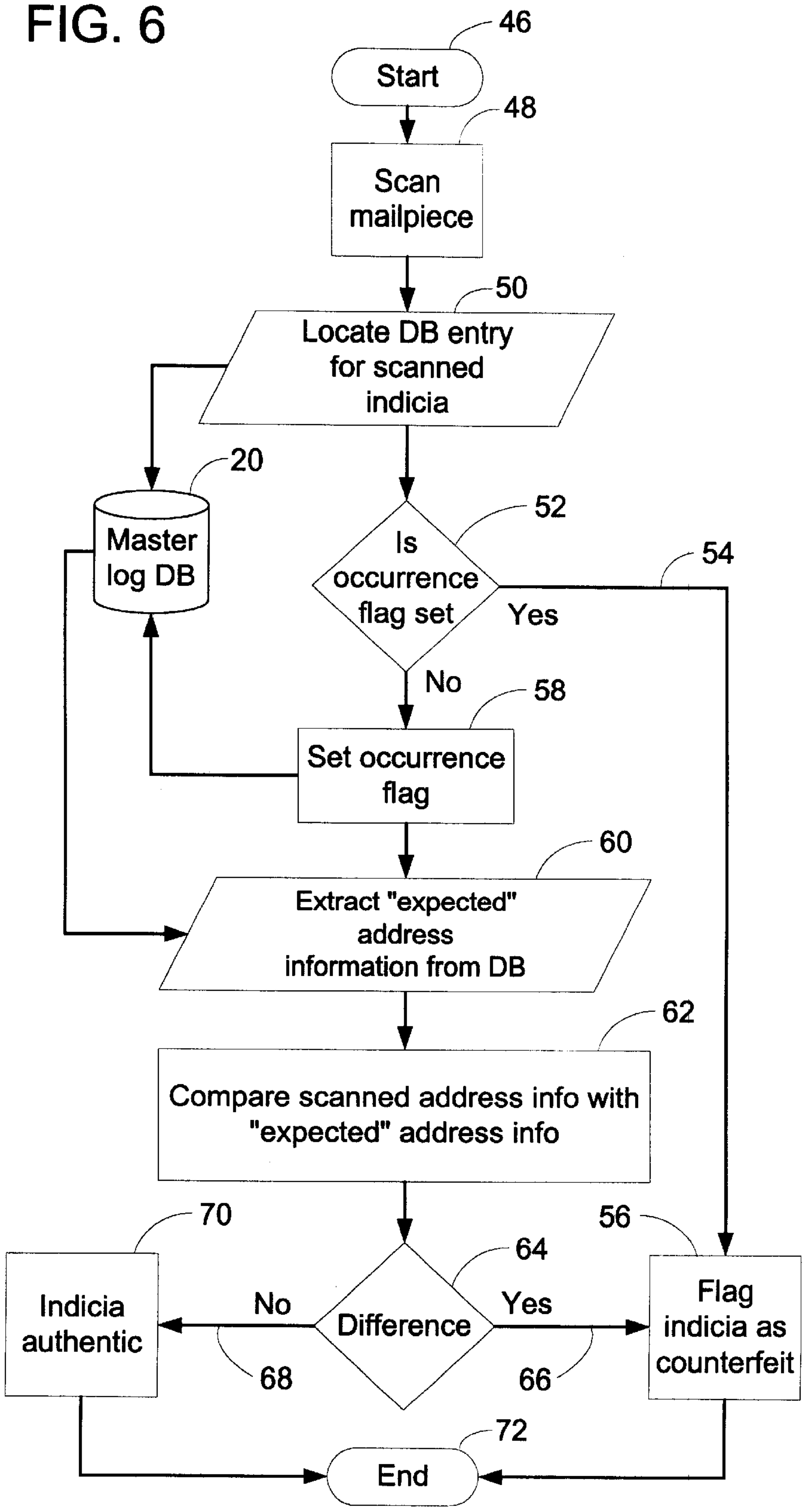
FIG. 6 is a simplified flow diagram illustrating aspects of a method of the instant invention.

One such method in accordance with the teachings of the instant invention is illustrated in flow diagrammatic form in FIG. 6 to which specific reference is now made. In this embodiment of the method of the instant invention, the process is begun 46 upon the entry of a mailpiece into the postal system. In the processing, the mailpiece is scanned 48 to verify the authenticity of the postage indicia. Many steps may be performed within the postal authority 10 to verify the authenticity of the mailpiece, including various cryptographic techniques to verify that the indicia has been properly generated. This step may be dispensed with if plain text indicia is utilized, or may be simplified to checking for proper indicia sequence format or range checking. For the purposes of the instant invention, the indicia transaction or serial number is extracted from the scanned indicia and used by the system to locate the database entry for the scanned indicia transaction or serial number 50.

Once the entry for this indicia has been identified, its record (see FIG. 5) is examined to determine if the occurrence flag has been set 52. This occurrence flag allows the postal authority 10 to identify multiple occurrences of the same postage indicia as may result from a mailer repeatedly copying the same postage indicia on mailpieces to be delivered to the same recipient. If the occurrence flag has previously been set as indicated by decision branch 54, the indicia is flagged as being counterfeit 56. The postal authority 10 may then use this information in any way it deems appropriate, such methods are beyond the scope of the instant invention and will not be discussed further herein. If the decision step 52 determines that the occurrence flag has not previously been set indicating that this is the first occurrence of a mailpiece with the identified indicia contained thereon, the system of the instant invention will set the occurrence flag at step 58.

Once this flag has been set, the system continues by extracting the "expected" address information from this indicia's record in the database 20 at step 60. The system of the instant invention then compares the scanned address information from the mailpiece with the "expected" address information extracted from the master log database 20 at step 62. If a difference between these two sets of information is detected at decision block 64, as indicated by decision branch 66, the mailpiece is again identified as containing counterfeit indicia as indicated at step 56. If, however, there is no difference between the scanned and expected address information as indicated by decision branch 68, the indicia is determined to be authentic as indicated at step 70. Once one of these two alternatives has been identified, the process ends as indicated by termination block 72.

Figure 7:
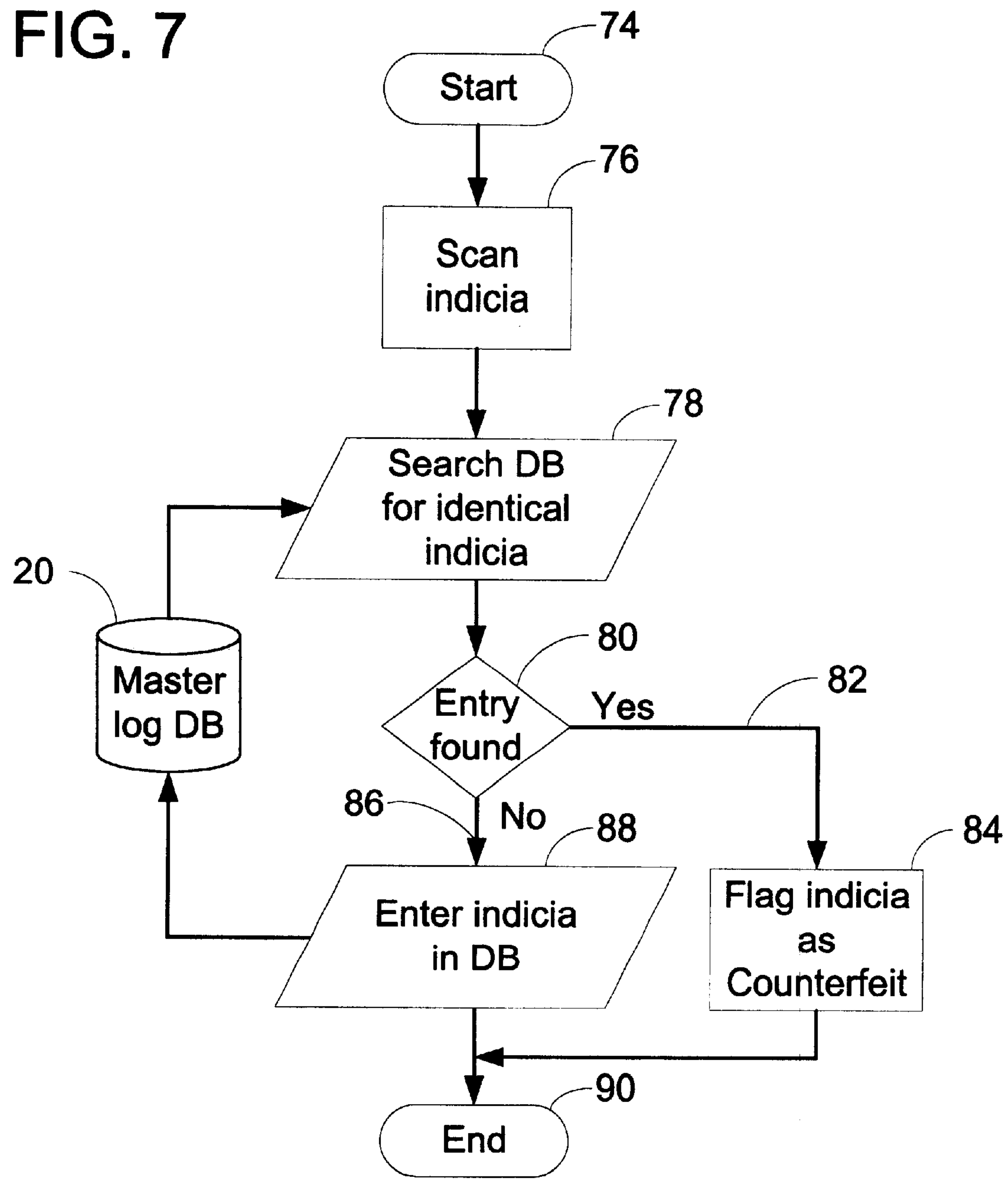
FIG. 7 is a simplified flow diagram illustrating aspects of an alternate embodiment of the method of the instant invention.

It an alternative embodiment of the instant invention, the method illustrated in flow diagrammatic form in FIG. 7 may be utilized. In this embodiment, the process is again begun 74 upon the entry of a mailpiece into the postal system. As with the prior method, the mailpiece is then scanned 76 to determine the authenticity of the postage indicia contained thereon. Once the indicia has been properly scanned and authenticated, which may or may not include cryptographic techniques, the system of the instant invention performs a search on the master log database to determine if this indicia has ever been scanned and entered into the database previously at step 78. If an identical entry is found as indicated by decision branch 82 of decision block 80, the mailpiece is identified as containing a counterfeit indicia as the step 94. If, however, this indicia has never been scanned before as indicated by decision branch 86, the indicia is entered into the database at step 88.

Existence in the master log database 20 in this embodiment of the system of the instant invention indicates that the indicia has been identified as existing on a mailpiece. With this information, the system of the instant invention is able to identify a counterfeit by simply checking the database to determine if this identical indicia has ever been used and scanned before. Obviously, if the indicia has previously been scanned in association with another mailpiece, signified by its entry into the master log database 20, its identical reappearance can only be the result of a counterfeit. After these determinations are made, the method of the instant invention terminates at block 90.

Figure 8:
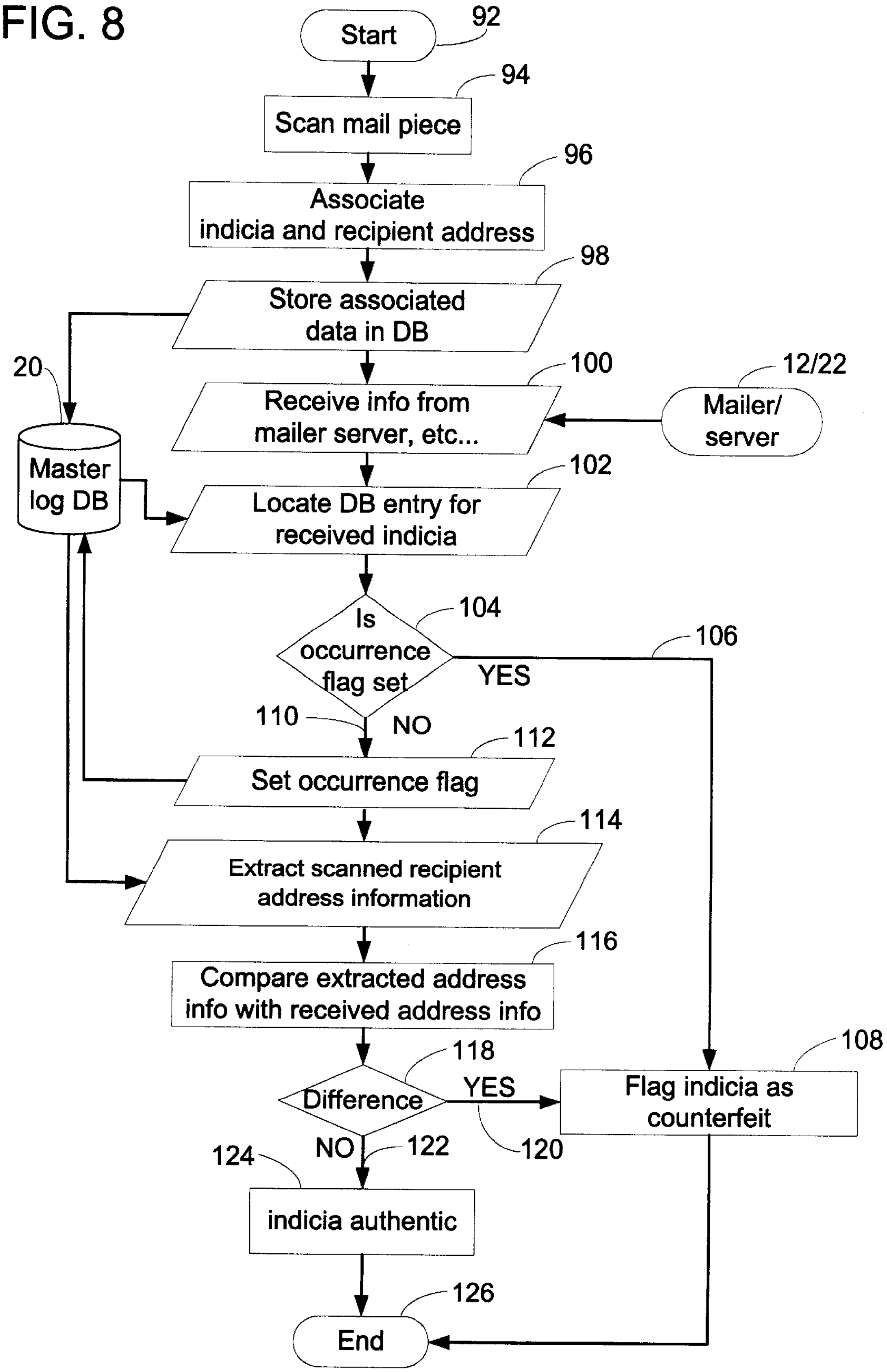
FIG. 8 is a simplified flow diagram illustrating aspects of an alternate embodiment of the method of the instant invention.

In an alternate embodiment of the instant invention, the information concerning the postage indicia and recipient address may be first obtained from the mailpiece prior to receiving the information from the external mailer or server as discussed briefly above. As illustrated in FIG. 8, this method begins at block 92 upon the entry of a mailpiece into the postal system. Once within the system the mailpiece is scanned 94 and appropriate authenticity checks are performed on the indicia to verify that it conforms with the standards of indicia generation, be they cryptographically secured or printed in plain text. The indicia transaction or serial number information is then associated with the recipient address information at step 96. Once this information has been associated, it is then stored in the in master log database 20 at step 98.

Once the log information is received from the mailers 12 and servers 22 at block 100, the system of the instant invention locates the database entry for each of the received indicia from the mailers and servers at block 102. Once an entry has been located, the occurrence flag is checked at step 104 to determine whether or not identical information has been received from another mailer/server. If the occurrence flag has been set as indicated by decision branch 106, the indicia is flagged as being counterfeit for appropriate follow up and investigation by the postal authority at step 108. If the occurrence flag had not previously been set as indicated by decision branch 110, the occurrence flag is then set by the system at step 112.

Once these initial steps have been performed, the scanned recipient address information previously stored in the master log database 20 is extracted at step 114. This extracted information is then compared with the information received from the mailers/senders at step 116. If a difference between this address information is detected by decision block 118 as indicated by decision branch 120, the indicia is again flagged as being counterfeit at block 108 for follow up and investigation by the postal authority. If there is no difference detected in the prior scanned address information and the address information received from the mailers/senders as indicated by decision branch 122, the indicia is indicated as being authentic at block 124. Once the indicia has either been authenticated or indicated as being counterfeit, the system ends at block 126.

In an alternative embodiment, the indicia itself does not include a digital signature or any other type of cryptographically-secured information. Rather, the indicia is entirely in plain text (although encoded in machine-readable format such as bar code). The content of the plain text indicia includes an indicia serial number and postage amount. At the time the indicia is created, the system records the postage amount, indicia serial number and recipient address into a record of log file. This record is digitally signed, and the digital signature made a part of the record. Alternatively, the log file may include a copy of the digital signature that, in the above-described embodiments, was printed on the envelope. Alternatively, if system is a trusted system subject to appropriate security measures, the digital signature may be omitted.

As described above, the log file is periodically transmitted to postal authority. As postal authority processes mailpieces, it may verify payment of postage by looking up in log file the record containing the indicia whose serial number is printed on the envelope. If the indicia serial number exists in the log file, the postal authority has evidence that the indicia was an authorized indicia. The postal authority can then compare the amount of postage as printed on the envelope to the amount of postage contained in corresponding record of log file. A discrepancy indicates potential unauthorized use of the indicia. As explained above, postal authority can also compare the recipient's address as contained in the record with the address that appears in human readable format on the mailpiece. A discrepancy indicates potential unauthorized use of the indicia. These comparisons may be made in real time or batch mode (such as in periodic auditing) by selectively retaining images of mailpieces. A flag field in record can be set by postal authority indicate when the corresponding indicia has been processed. If a duplicate indicia (as determined by two indicia having the same serial number) is encountered in the mailstream, this flag will indicate that the indicia has been previously processed. The existence of duplicate indicia indicates potential unauthorized use of the indicia.

Numerous modifications and alternative embodiments of the invention will be apparent to those skilled in the art in view of the foregoing description. Accordingly, this description is to be construed as illustrative only and is for the purposes of teaching those skilled in the art the best mode for carrying out the invention. The details of the structure may be varied substantially without departing from the spirit of the invention, and exclusive use of all modifications that come within the scope of the appended claims is reserved.

We claim:

1. A method of authenticating mailpieces by a mail processing organization, comprising:

scanning a mailpiece to extract transaction number information from an indicia contained thereon, the indicia containing information exclusive of recipient address information, and to extract recipient address information from the mailpiece;

searching a database for an entry for the mailpiece;

checking an occurrence flag to determine prior use of the indicia; and flagging the indicia as counterfeit when the occurrence flag is set.

2. The method of claim 1, further comprising the steps of:

extracting expected address information from the database;

comparing the recipient address information obtained by said step of scanning with the expected address information; and flagging the indicia as counterfeit when a difference between the recipient address information and the expected address information.

3. The method of claim 1, further comprising the steps of:

receiving log information relating the transaction number of the indicia with the recipient address information; and storing the log information in the database.

4. The method of claim 1, wherein said step of scanning includes the step of verifying authenticity of the indicia.

5. The method of claim 1, further comprising the steps of:

associating the indicia with the recipient address information; and storing the associated indicia and recipient address information in the database.

6. The method of claim 5, further comprising the steps of:

receiving log information for the mailpiece relating the transaction number of the indicia with the expected recipient address information;

locating the associated indicia and recipient address information in the database;

checking the occurrence flag;

setting the occurrence flag when the occurrence flag is not set at said step of checking; and flagging the indicia as counterfeit when the occurrence flag is set at said step of checking.

7. The method of claim 6, further comprising the steps of:

extracting the expected address information from the database;

comparing the recipient address information obtained by said step of scanning with the expected address information; and flagging the indicia as counterfeit when a difference between the recipient address information and the expected address information exists.

8. The method of claim 1, further comprising the steps of:

processing postage requests from postage consumers, the postage requests including recipient address information for the mailpiece;

generating the indicia for the mailpiece; and associating the indicia with the recipient address information in the database.

9. The method of claim 8, further comprising the step of transmitting the indicia to the postage consumer for application on the mailpiece.

10. A method of authenticating a mailpiece, comprising the steps of:

scanning the mailpiece to extract the postal indicia;

searching a database for the postal indicia; and flagging the indicia as counterfeit when said step of searching locates the indicia in the database.

11. The method of claim 10, further comprising the step of entering the postal indicia in the database when said step of searching cannot locate the postal indicia in the database.

12. The method of claim 10, wherein said step of scanning the mailpiece includes the step of verifying authenticity of the indicia.

13. The method of claim 10, further comprising the steps of:

processing a postage request from a postage consumer, the postage request including recipient address information for the mailpiece;

generating the indicia for the mailpiece; and associating the indicia with the recipient address information in the database.

14. The method of claim 13, further comprising the step of transmitting the indicia to the postage consumer for application on the mailpiece.

15. A method of authenticating a mailpiece, comprising the steps of:

scanning the mailpiece to extract serial number information from a postal indicia and to extract recipient address information from the mailpiece;

associating the serial number information with the recipient address information;

storing the associated serial number information and recipient address information in a database; and thereafter receiving log information for the mailpiece including the serial number information and an expected recipient address;

searching the database to locate the associated serial number information and recipient address information corresponding to the log information;

checking an occurrence flag for the associated serial number information and recipient address information; and flagging the mailpiece as counterfeit when the occurrence flag is set.

16. The method of claim 15, further comprising the step of setting the occurrence flag when said step of checking determines that the occurrence flag is not set.

17. The method of claim 15, further comprising the steps of:

extracting the expected recipient address information from the database;

comparing the recipient address information obtained by said step of scanning with the expected address information; and flagging the indicia as counterfeit when a difference between the recipient address information and the expected address information exists.

18. The method of claim 15, wherein said step of scanning the mailpiece includes the step of verifying an authenticity of the indicia.

19. The method of claim 15, further comprising the steps of:

processing a postage request from a postage consumer, the postage request including recipient address information for the mailpiece;

generating the indicia for the mailpiece; and associating the indicia with the recipient address information in the database.

20. The method of claim 19, further comprising the step of transmitting the indicia to the postage consumer for application on the mailpiece.

* * * * *

UNITED STATES PATENT AND TRADEMARK OFFICE

CERTIFICATE OF CORRECTION

PATENT NO. : 6,527,178 B1
DATED : March 4, 2003
INVENTOR(S) : Gordon et al.

It is certified that error appears in the above-identified patent and that said Letters Patent is hereby corrected as shown below:

Title page,
Item [75], should read -- Roy R. Gordon --

Signed and Sealed this

Fifth Day of August, 2003

JAMES E. ROGAN
*Director of the United States Patent and Trademark Office*